US012128574B2

(12) United States Patent
Phoon

(10) Patent No.: US 12,128,574 B2
(45) Date of Patent: Oct. 29, 2024

(54) STATIONARY BLADE, BLADE SET, AND MANUFACTURING METHOD

(71) Applicant: KONINKLIJKE PHILIPS N.V., Eindhoven (NL)

(72) Inventor: Kin Fatt Phoon, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 561 days.

(21) Appl. No.: 16/613,845

(22) PCT Filed: May 22, 2018

(86) PCT No.: PCT/EP2018/063286
§ 371 (c)(1),
(2) Date: Nov. 15, 2019

(87) PCT Pub. No.: WO2018/219704
PCT Pub. Date: Dec. 6, 2018

(65) Prior Publication Data
US 2020/0164533 A1 May 28, 2020

(30) Foreign Application Priority Data
May 30, 2017 (EP) .................................... 17173561

(51) Int. Cl.
*B26B 19/38* (2006.01)
*B26B 19/06* (2006.01)
*B26B 19/12* (2006.01)

(52) U.S. Cl.
CPC .......... *B26B 19/3846* (2013.01); *B26B 19/06* (2013.01); *B26B 19/12* (2013.01)

(58) Field of Classification Search
CPC ..... B26B 19/3846; B26B 19/06; B26B 19/02; B26B 19/10; B26B 19/04
(Continued)

(56) References Cited

U.S. PATENT DOCUMENTS 2,114,219 A * 4/1938 Florman ................. B26B 19/06 30/346.51
2,151,965 A * 3/1939 Hanley ................. B26B 19/042 30/43.92

(Continued)

FOREIGN PATENT DOCUMENTS

CN 106346519 1/2017
CN 114043533 A * 2/2022 ............. B26B 19/10

(Continued)

OTHER PUBLICATIONS

International Search Report and Written Opinion Dated Aug. 13, 2018 For International Application No. PCT/EP2018/063286 Filed May 22, 2018.

*Primary Examiner* — Evan H Macfarlane
*Assistant Examiner* — Fernando A Ayala

(57) ABSTRACT

The present disclosure relates to a stationary blade (42) for a blade set (26) of a hair cutting appliance (10), said blade set (26) being arranged to be moved through hair in a moving direction to cut hair, said stationary blade (42) comprising a support insert (70), and a metal component (68) at least sectionally deformed to define a toothed leading edge (32, 34) having double-walled stationary blade teeth (44), wherein the metal component (68) forms a first wall (100) that is arranged to serve as a skin-facing wall when in operation, and a second wall (102) that is facing away from the first wall (100), wherein the first wall (100) and the second wall (102) are joined at the toothed leading edge (32, 34), wherein the support insert (70) connects the first wall (100) and the second wall (102), wherein the metal component (68) is held in place by the support insert (70), and wherein the metal component (68) and the support insert (70) jointly form a guide slot (60) for a movable blade (62). The disclosure further relates to a blade set (26) and to a (Continued)

method of manufacturing a blade set (26) for a hair cutting appliance (10).

19 Claims, 11 Drawing Sheets

(58) Field of Classification Search
USPC ........................................................ 30/43.9
See application file for complete search history.

(56) References Cited

U.S. PATENT DOCUMENTS

| | | | | | | |
|---|---|---|---|---|---|---|
| 2,184,757 | A | * | 12/1939 | Samotey | B26B 19/042 | 30/43.92 |
| 2,249,825 | A | * | 7/1941 | Hanley | B26B 19/042 | 30/43.92 |
| 2,253,037 | A | * | 8/1941 | Knapp | B26B 19/042 | 30/43.92 |
| 2,273,739 | A | * | 2/1942 | Coletta | B26B 19/042 | 30/43.92 |
| 2,296,094 | A | * | 9/1942 | Dalkowitz | B26B 19/042 | 30/43.2 |
| 2,323,655 | A | * | 7/1943 | Hanley | B26B 19/38 | 30/346.51 |
| 2,326,192 | A | * | 8/1943 | Andis | B26B 19/386 | 30/43.92 |
| 3,008,233 | A | * | 11/1961 | Waggoner | B26B 19/3813 | 30/537 |
| 3,107,423 | A | * | 10/1963 | Caesar | B26B 19/20 | 30/537 |
| 3,178,815 | A | * | 4/1965 | Madrid | B26B 19/3813 | 30/286 |
| 3,477,127 | A | * | 11/1969 | Regan | B26B 19/40 | 30/41 |
| 4,174,568 | A | * | 11/1979 | Mixner | B26B 19/10 | 30/34.1 |
| 4,337,575 | A | * | 7/1982 | Trotta | B26B 21/227 | 30/47 |
| 4,403,412 | A | * | 9/1983 | Trotta | B26B 21/4068 | 30/47 |
| 4,549,352 | A | * | 10/1985 | Ochiai | B26B 19/3853 | 30/41.5 |
| 4,866,843 | A | * | 9/1989 | Kumano | B26B 19/102 | 30/34.1 |
| 5,341,571 | A | | 8/1994 | Prochaska | | |
| 6,418,623 | B1 | * | 7/2002 | Marcarelli | B26B 21/22 | 30/526 |
| 6,499,218 | B2 | * | 12/2002 | Rocha | B26B 21/4043 | 30/526 |
| 8,689,448 | B2 | * | 4/2014 | Ren | B26B 21/4012 | 30/52 |
| 9,381,655 | B2 | * | 7/2016 | Lau | B26B 19/22 | |
| 9,604,373 | B2 | * | 3/2017 | Park | B26B 21/4012 | |
| 10,406,702 | B2 | * | 9/2019 | Vredeveld | B26B 19/3846 | |
| 10,639,806 | B2 | * | 5/2020 | Bozikis | B26B 21/4087 | |
| 10,647,010 | B2 | * | 5/2020 | Sablatschan | B26B 19/3893 | |
| 11,090,824 | B2 | * | 8/2021 | Bozikis | B26B 21/4025 | |
| 11,154,998 | B2 | * | 10/2021 | Liberatore | B26B 21/4012 | |
| 2008/0052883 | A1 | * | 3/2008 | Shiba | B26B 19/3886 | 24/598.1 |
| 2009/0188112 | A1 | * | 7/2009 | Prochaska | B26B 21/222 | 30/538 |
| 2009/0307908 | A1 | * | 12/2009 | Nakasuka | B26B 21/4012 | 30/41 |
| 2013/0160296 | A1 | * | 6/2013 | Park | B26B 21/38 | 30/34.05 |
| 2013/0205595 | A1 | * | 8/2013 | Bykowski | B26B 21/4068 | 30/64 |
| 2015/0047203 | A1 | | 2/2015 | Stepelbroek | | |
| 2017/0028576 | A1 | * | 2/2017 | Sablatschan | B26B 19/042 | |
| 2017/0113361 | A1 | * | 4/2017 | Feijen | B26B 19/3893 | |
| 2017/0144319 | A1 | * | 5/2017 | Sablatschan | B26B 19/3893 | |
| 2018/0104834 | A1 | * | 4/2018 | Zuidervaart | B26B 19/3846 | |
| 2018/0257248 | A1 | * | 9/2018 | Wu | B26B 19/3846 | |
| 2018/0311845 | A1 | * | 11/2018 | Moustakas | B26B 21/4012 | |
| 2018/0311847 | A1 | * | 11/2018 | Ntavos | B26B 21/4025 | |
| 2018/0354146 | A1 | * | 12/2018 | Brellis | B26B 21/4068 | |
| 2019/0381681 | A1 | * | 12/2019 | Park | B26B 21/14 | |
| 2022/0314478 | A1 | * | 10/2022 | Galanis | B26B 21/222 | |

FOREIGN PATENT DOCUMENTS

| | | | | | |
|---|---|---|---|---|---|
| EP | 3854547 | A1 | * | 1/2021 | B26B 19/38 |
| WO | 2013/150412 | | | 10/2013 | |
| WO | 2016/042158 | | | 3/2016 | |

* cited by examiner

STATIONARY BLADE, BLADE SET, AND MANUFACTURING METHOD

CROSS REFERENCE TO RELATED APPLICATIONS

This application is the U.S. National Phase application under 35 U.S.C. § 371 of International Application No. PCT/EP2018/063286 filed May 22, 2018, published as WO 2018/219704 on Dec. 6, 2018, which claims the benefit of European Patent Application Number 17173561.6 filed May 30, 2017. These applications are hereby incorporated by reference herein.

FIELD OF THE INVENTION

The present disclosure relates to a stationary blade for a blade set of a hair cutting appliance, to a blade set and to a respectively equipped hair cutting appliance. Further, the present disclosure relates to a method of manufacturing a blade set for a hair cutting appliance.

BACKGROUND OF THE INVENTION

WO 2013/150412 A1 discloses a stationary blade for a blade set of an electrically operated hair cutting appliance, the blade including a first wall and a second wall, each wall defining a first surface, a second surface facing away from the first surface, and a laterally extending leading edge defining a plurality of laterally spaced apart longitudinally extending projections, wherein the first surfaces of the first and second walls face each other, at least at their leading edges, while facing projections along the leading edges of the first and second walls are mutually connected at their tips to define a plurality of generally U-shaped teeth, and the first surfaces of the first and second walls define a laterally extending guide slot for a movable blade of said blade set between them, wherein the projections of the first wall have an average thickness that is less than an average thickness of the projections of the second wall.

Manufacturing approaches to double walled stationary blades are disclosed in WO 2016/001019 A1 and WO 2016/042158 A1 that describe arrangements wherein at least the top wall of the stationary blade is at least substantially made from sheet metal material. In both documents, an integral design of metal parts and non-metal parts is proposed, involving integrally manufacturing sheet metal and injection molding parts. Hence, insert molding and/or overmolding are proposed to combine the benefits of metal components and non-metal molded components.

CN 106346519 A discloses a blade set for a cutter head of a shaver, the blade set comprising a fixed blade that is provided with a toothed leading edge, a fixed blade bracket for supporting and securing the fixed blade, and, at an inner side of the fixed blade, a moving blade having corresponding teeth, wherein the moving blade can move back and forth relative to the fixed blade to cut hair, and wherein the fixed blade is a flexible metal sheet that is tensioned and secured at the fixed blade bracket. CN 106346519 A further proposes to tension the flexible metal sheet by the fixed blade bracket similar to a bowstring. To this end, it is further proposed to fold the flexible metal sheet around front and rear edges of the fixed blade bracket, and to secure the folded flexible metal sheet at the fixed blade bracket by any of welding, riveting and bonding.

Cutting appliances are well known in the art. Cutting appliances may particularly involve hair cutting appliances. In a more general context, the present disclosure addresses personal care appliances, particularly grooming appliances. Grooming appliances involve, but are not limited to, hair cutting appliances, particularly trimming appliances, shaving appliances, and combined (dual-purpose or multi-purpose) appliances.

Hair cutting appliances are used for cutting human hair, and occasionally animal hair. Hair cutting appliances may be used for cutting facial hair, particularly for shaving and/or for beard trimming. Further, cutting appliances are used for cutting (involving shaving and trimming) head hair and body hair.

In the trimming mode, the hair cutting appliance is typically equipped with a so-called spacing comb that is arranged to space away the blade set of the hair cutting appliance from the skin. Depending on the effective (offset) length of the spacing comb, a remaining hair length after the trimming operation may be defined.

Hair cutting appliances in the context of the present disclosure typically comprise a cutting head which may be referred to as processing head. At the cutting head, a blade set is provided, the blade set comprising a so-called stationary blade and a so-called movable blade. When the hair cutting appliance is operated, the movable blade is moved with respect to the stationary blade which may involve that respective cutting edges cooperate with one another to cut hair.

Hence, in the context of the present disclosure a stationary blade is arranged to be attached to the hair cutting appliance in such a way that a drive unit thereof is not cooperating with the stationary blade. Rather, the drive unit is typically coupled with the movable blade and arranged to set the movable blade into motion with respect to the stationary blade. Hence, the stationary blade may be, in some embodiments, fixedly attached to a housing of the hair cutting appliance.

However, in alternative embodiments, the stationary blade is arranged at the housing of the hair cutting appliance in a pivotable fashion. This may for instance enable a contour-following feature of the cutting head of the hair cutting appliance. Therefore, the term stationary blade, as used herein, shall not be interpreted in a limiting sense. Further, needless to say, when the hair cutting appliance as such is moved, also the stationary blade is moved. However, the stationary blade is not arranged to be actively actuated to cause a cutting action. Rather, the movable blade is arranged to be moved with respect to the stationary blade.

The stationary blade may also be referred to as guard blade. Typically, when the hair cutting appliance is operated to cut hair, the stationary blade is, at least in part, arranged between the movable blade and the hair or skin of the user. As used herein, the term user shall refer to a person or subject whose hair is being processed or cut. In other words, the user and the operator of the hair cutting appliance are not necessarily one and the same person. The term user may also involve a client at a hairdresser or barber shop.

In some aspects, the present disclosure relates to hair cutting appliances that are capable of both trimming and shaving operations. In this context, hair cutting appliances are known that incorporate a dual cutting arrangement including a first blade set that is suitably configured for trimming and a second blade set that is suitably configured for shaving. For instance, the shaving blade set may include a perforated foil that cooperates with a movable cutting element. Rather, the trimming blade set may include two blades that are respectively provided with teeth that cooperate with one another. In principle, the perforated foil that forms the stationary part of the shaving blade set may be much thinner than the stationary blade of a trimming blade set which, primarily for strength reasons, must be considerably thicker in conventional appliances.

The above WO 2013/150412 A1 proposes to provide the stationary blade with two walls, one of which is facing the skin of the user and the other one facing away from the user. The two walls are connected to one another and define, in a lateral view, a U-shaped profile that forms a guide slot for a movable cutter blade. Hence, the stationary blade is a double-walled blade. This has the advantage that the first wall may be arranged in a considerably thinner fashion as the second wall provides the stationary blade with sufficient strength. Therefore, such an arrangement is suitable for trimming, as respective teeth may be provided at the stationary blade and the movable blade. Further, the blade set is suitable for shaving as the effective thickness of the first wall of the stationary blade is considerably reduced.

Hence, several approaches to the manufacture of double-walled stationary blades and respective blade sets have been proposed. However, at least some of the above-indicated approaches still involve relatively high manufacturing costs, particularly molding costs and tooling costs. In particular, a combined sheet metal and injection molding approach, that involves insert molding or overmolding techniques, requires specific tools and manufacturing facilities. Further, relatively complex and cost-increasing auxiliary processes may be required, for instance grinding, lapping, deburring, etc.

Hence, in this respect, there is still room for improvement in the manufacture of blade sets for hair cutting appliances.

SUMMARY OF THE INVENTION

In view of the above, it is an object of the present disclosure to provide a stationary blade for a blade set of a hair cutting appliance and a corresponding method of manufacturing a stationary blade that enable a cost-efficient manufacture while maintaining the benefits of the double-walled design as discussed above. More particularly, it would be beneficial to present a method of manufacturing a stationary blade that primarily relies on rather simple manufacturing approaches that preferably do not require expensive tooling and complicated post-processing and/or assembly procedures. Further, it would be beneficial to dispense with hybrid manufacturing approaches that combine two or more rather distinct and different manufacturing methods (such as insert molding and/or overmolding of sheet metal components).

In other words, it would be beneficial to present a manufacturing approach that is based on conventional manufacturing methods but that enables the manufacture of stationary blades and blade sets in accordance with the above-indicated novel design approaches.

It is a further object of the present disclosure to provide a blade set that is equipped with a respective stationary blade and a movable blade that is movably retained in the stationary blade. Further, it is desirable to provide a hair cutting appliance to which a respective blade set may be mounted.

In a first aspect of the present disclosure a stationary blade for a blade set of a hair cutting appliance is presented, said blade set being arranged to be moved through hair in a moving direction to cut hair, said stationary blade comprising:

- a support insert, and
- a metal component at least sectionally deformed to define a toothed leading edge having double-walled stationary blade teeth,
- wherein the metal component forms a first wall that is arranged to serve as a skin-facing wall when in operation, and a second wall that is facing away from the first wall,
- wherein the first wall and the second wall are joined at the toothed leading edge,
- wherein the support insert connects the first wall and the second wall,
- wherein the metal component is held in place by the support insert, and
- wherein the metal component and the support insert jointly form a guide slot for a movable blade.

This aspect is based on the insight that the stationary blade may be manufactured using relatively simple and well-established manufacturing techniques, such as sheet metal processing, injection molding, etc. Preferably, the stationary blade is an assembled component of the blade set which may dispense with the need of complicated manufacturing techniques, such as 2K-injection molding, insert molding, overmolding and/or complex bonding techniques, involving welding, soldering, gluing, etc.

Hence, in contrast to the teaching of CN 106346519 A, it is not necessary to apply additional bonding techniques involving gluing, welding, riveting, soldering, etc., as the support insert may apply a pretensioning force on the metal component that sufficiently secures the mounting position. Eventually, the metal component and the support insert form a joint subassembly. Further, to form the first wall and the second wall, the metal component is transformed already before the insertion process takes place that results in the joint assembly comprising the support insert and the at least slightly pretensioned metal component.

Preferably, the support insert and the metal component that form at least a fundamental portion of the stationary blade each are easy to manufacture and, to form the stationary blade, easy to assemble. Further, the guide slot in which the movable blade is accommodated in the assembled state of the blade set is accomplished by assembling the support insert and the metal component. Hence, a positive fit mounting for the movable blade may be provided.

The support insert is arranged to secure the mounted position of the metal component. The support insert extends between the first wall and the second wall of the metal component and forms a vertical connection between the first wall and the second wall that defines the relative position of the first wall and the second wall in the mounted state.

Further, as a result of the mounting procedure when the metal component and the support insert are attached to one another, the metal component may be at least partially pretensioned, due to the shape of the support insert to define a certain retaining force that secures the mounted relative position of the metal component and the support insert.

Generally, the first wall and the second wall may be parallel to one another, and/or inclined with respect to one another. Further, also at least partially curved shapes at at least one of the first wall and the second wall may be envisaged. All these alternatives may form a double-walled arrangement having a first wall and a second wall that are facing away from one another.

In some embodiments, the metal component is based on a sheet metal blank that is deformed to form a U-shaped or a V-shaped arrangement at the respective toothed leading edges. This may involve bending or folding respective sections of the originally flat sheet metal component. In other words, at least in some embodiments, sections of the original sheet metal blank are wrapped around the support insert, thereby forming the first wall, the second wall, and the leading edge at the transition therebetween.

Generally, the stationary blade may also be referred to as guard blade. Generally, the movable blade may also be referred to as cutter blade.

The support insert may be regarded as an inlay that strengthens the metal component and that defines a final, assembled shape of the metal component. In other words, at least in a contact region of the stationary blade, the support insert may provide a connection or link between the first wall and the second wall of the metal component.

As indicated above, approaches to deform the metal component may involve bending, folding, etc. Respective material processing methods are generally subject to certain tolerances. In other words, bending, folding and similar processing methods for sheet metal parts often do not result in high-precision parts, but involve certain relatively large tolerances.

However, by providing the support insert that may be produced using a manufacturing method that enables high precision and great accuracy, a gage for the metal component may be provided. As the metal component is preferably shaped such that in the assembled state a certain preloading is present, primarily the shape of the support insert defines the resulting shape of the stationary blade, particularly in portions thereof that are important for the cutting performance.

The top side of the guide slot that is facing the skin when the blade set is in operation is delimited by the first wall of the stationary blade. In other words, the movable blade cooperates with the first wall, particularly with the portions of the stationary blade teeth that are formed at the first wall, to cut hair.

The support insert provides a vertical connection between the first wall and the second wall, particularly in a central region of the stationary blade that is spaced away from the teeth thereof. Generally, the vertical direction is perpendicular to a main extension plane of the first wall. Hence, the support insert may define a height of the guide slot at the stationary blade. The vertical extension (height) of the guide slot is primarily defined by the shape of the support insert which may be produced with relatively small tolerances. This has a beneficial effect on the overall accuracy and performance of the blade set that incorporates the stationary blade.

The support insert may be obtained from a molding process, particularly from injection molding. However, in some alternative embodiments, the support insert may be obtained from a casting process that processes metal material. Further, the support insert may be obtained by machining an intermediate part to form the desired final shape.

However, in major embodiments of the present disclosure, the support insert is a plastic part that is obtained from a relatively simple injection molding procedure. Preferably, complex combined manufacturing procedures such as insert molding, overmolding, multi-component molding, etc. may be avoided.

Generally, the support insert may be produced from plastic material, metal material, involving light metal, such as aluminum alloy, or from another appropriate material that is considerably solid and dimensionally stable.

In an exemplary embodiment of the stationary blade, the stationary blade teeth are, when viewed in a cross-sectional plane perpendicular to a lateral direction, substantially U-shaped or V-shaped and comprise a first leg formed by the first wall and a second leg formed by the second wall, wherein the first leg and the second leg merge into one another to form a tip of the stationary blade teeth.

In this way, as indicated above, the second leg that is defined by the second wall may provide the stationary blade teeth with an increased strength and stability, whereas the minimum cutting length is defined by the first leg only.

In a further exemplary embodiment of the stationary blade, the metal component is basically planar at the skin-facing first wall. This improves the operational comfort and reduces the operating force for the user.

In a further exemplary embodiment of the stationary blade, the first wall and the second wall are spaced away from one another by the support insert. Hence, as indicated above, the support insert may act as a spacer or a gage between the first wall and the second wall, particularly to define a spacing between the first leg and the second leg. Further, the support insert may be used to define a vertical extension (height) of the guide slot.

In yet another exemplary embodiment of the stationary blade, the metal component and the support insert are force-fitted to one another in an assembled state of the stationary blade. Hence, due to the pretensioning or preloading that is necessary to mount the metal component at the support insert, a certain force is generated that retains the metal component in the intended assembly position. As such, the assembly composed of the metal component and the support insert is self-retaining. However, this does not exclude that further measures are taken to secure the mounted state.

In yet another exemplary embodiment of the stationary blade, the metal component and the support insert form an interference-fitted assembly. Again, it is necessary to (resiliently) deform the metal component to enable the mounting procedure. In the mounted state, an internal stress of the metal component, due to the resilient deformation, causes the retaining force.

In a further exemplary embodiment of the stationary blade, the first wall and the second wall of the metal component are, in an unassembled state, spaced away from one another in a contact region by a clearance $\alpha_{cl}$, $l_{cl}$ that is smaller than a spacing offset $\alpha_o$, $l_o$ that is present at the support insert at the contact region in the assembled state. Hence, the spacing offset $\alpha_o$, $l_o$ is defined by the manufacture of the support insert and does not considerably change during mounting. By contrast, the clearance at the metal component is only present in the non-assembled state as the metal component is at least slightly deformed in the mounted state so that the clearance approaches the spacing offset $\alpha_o$, $l_o$.

In a further exemplary embodiment of the stationary blade, the clearance is one of a vertical spacing distance $l_{cl}$ and a spacing opening angle $\alpha_{cl}$ between the first wall and the second wall in the contact region. Generally, in the contact region a certain gap between the first wall and the second wall is provided that is smaller than a corresponding offset formed at the support insert. Due to the interference between the offset and the gap, the metal component is preloaded/pretensioned in the mounted state.

In yet another exemplary embodiment of the stationary blade, the metal component is a sheet metal component, wherein the support insert is a separately formed injection molded plastic part. Preferably, the metal component and the support insert are not jointly manufactured by any of multiple-component injection molding, insert molding, overmolding, etc.

In yet another exemplary embodiment of the stationary blade, the support insert defines a laterally extending guide contour for the movable blade. Hence, the support insert may be used to form further features of the stationary blade that are not easy to form by processing the metal component. As the support insert is preferably molded, it is easy to include further features therein.

In yet another exemplary embodiment of the stationary blade, at the support insert a laterally extending guide projection is formed that forms a longitudinal boundary of the guide slot and that contacts the first wall of the metal component. The laterally extending guide projection may enable a lateral movement of the movable blade with respect to the stationary blade, and may define a longitudinal position of the movable blade with respect to the stationary blade. Hence, the laterally extending guide projection may also define a tip to tip distance between the tips of the teeth of the movable blade and the stationary blade.

In yet another exemplary embodiment of the stationary blade, the support insert forms a frontal longitudinal boundary and a rear longitudinal boundary of the guide slot. The rear longitudinal boundary may be formed by the laterally extending guide projection. Further, the guide slot is bounded by the first wall at a top side thereof. Eventually, the stationary blade forming the guide slot may entirely or nearly entirely encompass or embrace the movable blade. Hence, the movable blade is secured and guarded in the stationary blade.

Further, in another exemplary embodiment of the stationary blade, the support insert forms a bottom boundary of the guide slot. An opposite top boundary of the guide slot is formed by the first wall. Hence, in some embodiments, the movable blade is accommodated between the support insert and the first wall. As in some embodiments the support insert is a plastic part, this may have a beneficial effect on ease of movement of the movable blade. Frictional forces are greatly reduced. At the side where the cutting edges of the movable blade teeth and the stationary blade teeth are present, metal parts contact one another.

However, in some alternative embodiments, the bottom boundary of the guide slot is formed by the second wall of the metal component, at least in part. Hence, in these embodiments, the movable blade is at least partially retained in the vertical direction between two metal layers that are defined by the metal component.

In yet another exemplary embodiment, the stationary blade comprises a first toothed leading edge and a second toothed leading edge opposite to the first wall of the metal component extends from the first toothed leading edge to the second toothed leading edge. Hence, a dual-side stationary blade and a corresponding blade set may be formed. This increases the performance and the field of application for a respectively equipped hair cutting appliance.

The above exemplary embodiment does not exclude that the toothed leading edge at the stationary blade is curved or even circularly shaped. Hence, the relative movement between the movable blade and the stationary blade may involve a reciprocating movement, an oscillatory movement, and/or a rotatory movement.

In still another exemplary embodiment of the stationary blade, a laterally extending guide projection is formed between the first toothed leading edge and the second toothed leading edge. Hence, a central region of the stationary blade may be used for a guide arrangement that defines the longitudinal relative position of the movable blade with respect to the stationary blade.

In yet another exemplary embodiment of the stationary blade, at a bottom side, the support insert extends beyond the metal component, wherein mounting features are formed at the bottom side of the support insert. Preferably, the mounting features are integrally formed with the support insert. Hence, a snap-on mounting or a similar mounting may be provided without the need of adding separate mounting parts to the stationary blade.

In still another exemplary embodiment of the stationary blade, in the mounted state, a longitudinal tip offset is provided between tips of the tooth portions of the support insert and tips of the tooth portions of the metal component that defines a clearance between the support insert and the metal component at at least some of the a stationary blade teeth. This facilitates assembling the metal component and the support insert which includes, in some exemplary embodiments, a lateral relative sliding movement therebetween when the support insert in inserted in the metal component.

In another aspect of the present disclosure there is presented a blade set for a hair cutting appliance, the blade set comprising:

- a stationary blade in accordance with at least one embodiment as described herein, and
- a movable blade comprising a plurality of movable blade teeth,
- wherein the movable blade is movably secured between the metal component and the support insert in the assembled state, and
- wherein the movable blade and the stationary blade are arranged to be moved with respect to one another to cut hair.

Generally, the blade set may provide a positive-fit mounting for the movable blade at the guide slot that is mutually defined by the metal component and the support insert.

In some exemplary embodiments, to define the vertical position of the movable blade, the metal component and the support insert define therebetween a tight (vertical) mounting clearance for the movable blade in the guide slot.

However, in alternative embodiments, the metal component and the support insert define therebetween a considerably large (vertical) mounting clearance for the movable blade in the guide slot. In accordance with this embodiment, at least one force generating element (e.g. a spring) is provided at the bottom end of the guide slot that urges the movable blade against to top end of the guide slot. Hence, also a force-closed or force-supported assembly of the movable blade in the guide slot is conceivable. The movable blade may be spring loaded in the guide slot.

Preferably, the movable blade is retained between the metal component and the support insert in the assembled state in an undetachable manner.

In an exemplary embodiment of the blade set, in the movable blade, a guide recess is formed, wherein a guide projection of the support insert extends into the guide recess to provide a positive-fit mounting for the movable blade at the stationary blade. The guide recess and the guide projection jointly define the longitudinal position of the movable blade at the stationary blade.

In another exemplary embodiment of the blade set, the metal component and the support insert form an assembly, wherein the metal component and the support insert are separately formed. Preferably, the metal component and the support insert are not directly bonded to one another. In other words, the metal component and the support insert may be assembled to one another to form the stationary blade.

In yet another exemplary embodiment, the blade set further comprises a lateral end cap that contacts a lateral end of the support insert via which the metal component is assembled thereto. Hence, a simply shaped mounting part may be provided that secures the assembly of the stationary blade and that further defines a lateral limit stop for the movable blade in the guide slot.

In a further aspect of the present disclosure there is presented a method of manufacturing a blade set for a hair cutting appliance, the method comprising:

providing a metal component, comprising:

forming at least one pattern of slots in the metal component, transforming the metal component, thereby forming a first wall and a second wall, wherein the at least one pattern of slots defines a series of stationary blade teeth arranged at a toothed leading edge that is jointly formed by the first wall and the second wall, providing a support insert having a mounting extension $\alpha_o$, $l_o$ that is greater than a mounting clearance $\alpha_{cl}$, $l_{cl}$ between the first wall and the second wall, in a contact region between the support insert and the metal component, providing a movable blade having movable blade teeth, arranging the movable blade at the support insert, joining the metal component and the support insert, involving laterally inserting the support insert in the metal component, wherein, in a mounted state, the metal component is held in place by the support insert in the contact region.

In other words, the step of joining the metal component and the support insert involves temporarily deforming (enlarging the mounting clearance of) the metal component to enable the insertion of the support insert therein. In the mounted state, the metal component is pretensioned and secured by the support insert that urges the first wall and the second wall away from one another.

The deformation of the metal component may involve outwardly bending the second wall away from the first wall, i.e. urging the second wall away from the first wall to increase the mounting clearance. Hence, in the mounted state, a remaining bias urges or bends or flexes the second wall inwardly, i.e. towards the first wall. That is, a preloading force is generated as the first wall and the second wall contact the support insert arranged therebetween.

In an exemplary embodiment of the manufacturing method, the step of joining a metal component and the support insert involves a force-fitted joining of the metal component and the support insert.

In yet another exemplary embodiment of the manufacturing method, the step of providing the metal component involves defining a mounting clearance $\alpha_{cl}$, $l_{cl}$ between the first wall and the second wall of the metal component that is smaller than the mounting extension $\alpha_o$, $l_o$ of the support insert in the contact region. Hence, by deliberately defining an interference between the metal component and the support insert, the assembly of the two parts may be secured.

In still another exemplary embodiment of the manufacturing method, the mounting clearance is one of a vertical spacing distance $l_{cl}$ and a spacing opening angle $\alpha_{cl}$ between the first wall and the second wall in the contact region.

In yet another aspect of the present disclosure there is presented a hair cutting appliance arranged to be moved through hair to cut hair, the appliance comprising:

a housing comprising a handle section, a drive unit arranged in the housing, and a cutting head comprising a blade set in accordance with at least one embodiment as described herein.

Generally, the blade set may comprise a basically linear leading edge defined by a respective series of stationary blade teeth (and movable blade teeth). In accordance with this embodiment, a basically reciprocating and substantially linear relative movement between the movable blade and the stationary blade is present. However, this does not exclude embodiments, wherein an at least somewhat curved (oscillatory) movement path of the movable blade with respect to the stationary blade is present. This may be caused, for instance, by a respective guiding linkage for the movable blade.

Further, in addition to basically linear arrangements of blade sets, also curved or even circular arrangements of blade sets may be envisaged. Hence, accordingly, a somewhat curved or circular leading edge defined by a respective arrangement of stationary blade teeth (and movable blade teeth) may be provided. Therefore, whenever reference herein is made to a longitudinal direction, a lateral direction and/or a height direction, this shall not be interpreted in a limiting sense. A curved or circular blade set may be defined and described with reference to similar directions, but also with reference to polar directions and/or further appropriate directional information. Hence, Cartesian coordinate systems, but also polar coordinate systems and further appropriate coordinate systems may be used to describe linear and/or curved designs of blade sets.

In some embodiments, the blade set is provided with two opposite leading edges, i.e. two opposite series of stationary blade teeth and movable blade teeth. In this way, both a pulling and a pushing movement of the blade set may be used for the cutting operation. Further, in this way the hair cutting appliance can be deployed more flexible which may facilitate styling operations and hair cutting operations in hard-to-reach areas.

Further preferred embodiments are defined in the dependent claims. It shall be understood that the claimed method has similar and/or identical preferred embodiments as the claimed device(s) and as defined in the dependent claims.

BRIEF DESCRIPTION OF THE DRAWINGS

These and other aspects of the disclosure will be apparent from and elucidated with reference to the embodiments described hereinafter. In the following drawings.

DETAILED DESCRIPTION OF THE INVENTION

Figure 1:
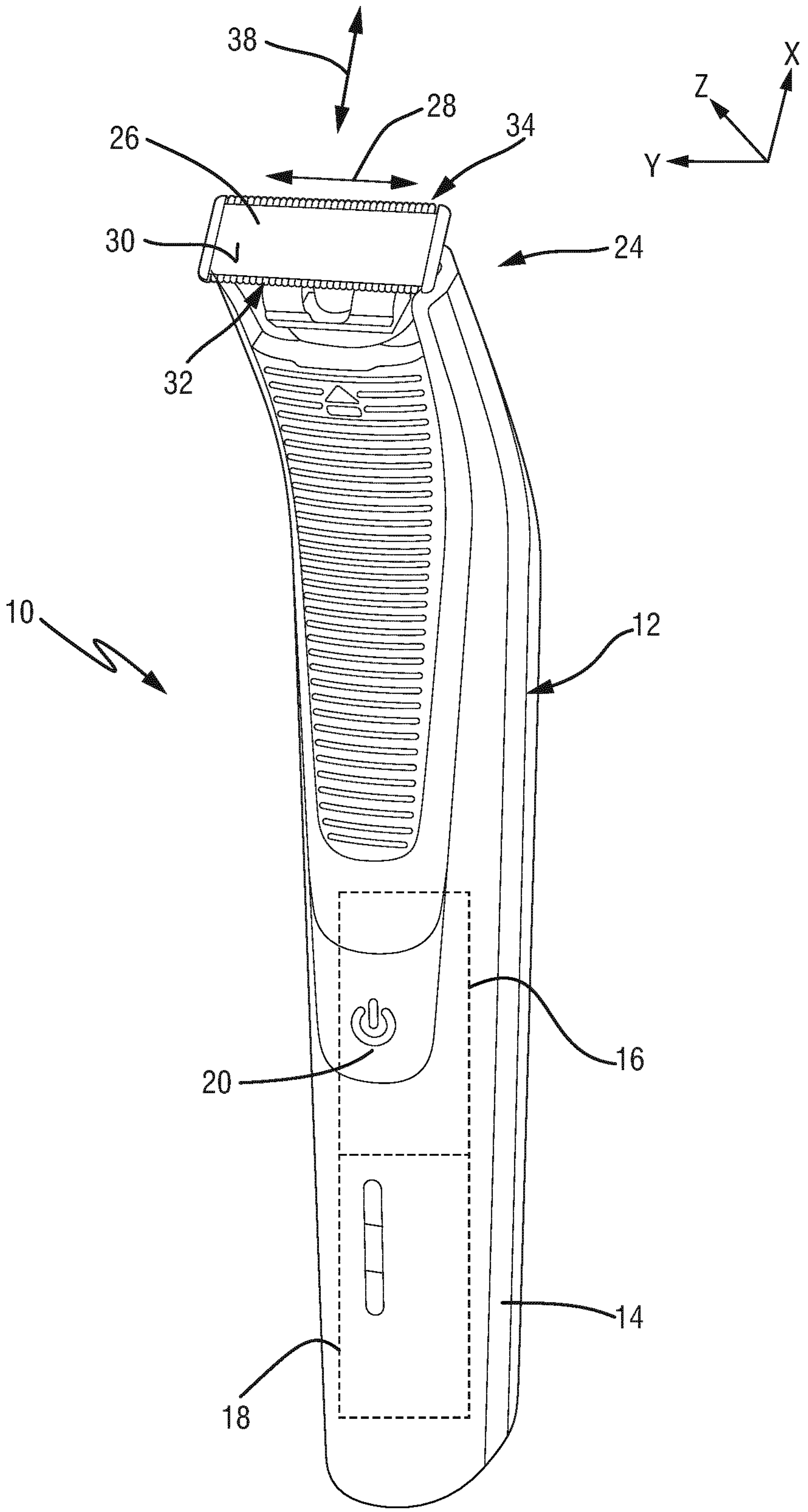
FIG. 1 shows a perspective frontal view of an exemplary embodiment of a hair cutting appliance.

FIG. 1 shows a perspective frontal view of a hair cutting appliance 10. The hair cutting appliance 10 is arranged as an appliance that is capable of both trimming and shaving.

The appliance 10 comprises a housing 12 which is arranged in an elongated fashion. At the housing 12, a handle section 14 is defined. In the housing 12, a drive unit 16 is arranged. Further, a battery 18 may be arranged in the housing 12. In FIG. 1, the drive unit 16 and the battery 18 are represented by dashed blocks. At the housing 12, operator controls 20 such as on/off buttons and the like may be provided.

At a top end thereof, the appliance 10 comprises a processing head 24 that is attached to the housing 12. The processing head 24 comprises a blade set 26. The blade set 26, particularly a movable blade thereof, may be actuated and driven by the drive unit 16 in a reciprocating fashion, refer also to the double arrow 28 in FIG. 1. As a result, respective teeth of the blades of the blade set 26 are moved with respect to one another, thereby effecting a cutting action. A top side or top surface of the blade set 26 is indicated by 30 in FIG. 1.

The blades of the blade set 26 may be arranged at a first leading edge 32 and, in at least some embodiments, at a second leading edge 34 that is opposite to the first leading edge 32. The first leading edge 32 may be also referred to as frontal leading edge. A second leading edge 34 may be also referred to as rear leading edge.

Further, a general advancing or moving direction of the appliance 10 is indicated in FIG. 1 by a double arrow 38. As the blade set 26 of the exemplary embodiment of FIG. 1 is equipped with two leading edges 32, 34, a push and a pull movement may be used to cut hair.

In the following, exemplary embodiments of stationary blades and blade sets 26 will be elucidated and described in more detail. The blade sets 26 may be attached to the appliance 10, or to a similar appliance. It goes without saying the single features disclosed in the context of a respective embodiment may be combined with any of the other embodiments, also in isolated fashion, thereby forming further embodiments that still fall under the scope of the present disclosure.

In some Figures shown herein, exemplary coordinate systems are shown for illustrative purposes. As used herein, an X-axis is assigned to a longitudinal direction. Further, a Y-axis is assigned to a lateral direction. Accordingly, a Z-axis is assigned to a vertical (height) direction. Respective associations of the axes/directions X, Y, Z with respective features and extensions of the blade set 26 can be derived from those Figures. It should be understood that the coordinate system X, Y, Z is primarily provided for illustrative purposes and not intended to limit the scope of the disclosure. This involves that the skilled person may readily convert and transform the coordinate system when being confronted with further embodiments, illustrations and deviating view orientations. Also a conversation of Cartesian coordinate systems into polar coordinate system may be envisaged, particularly in the context of a circular or curved blade set.

Figure 2:
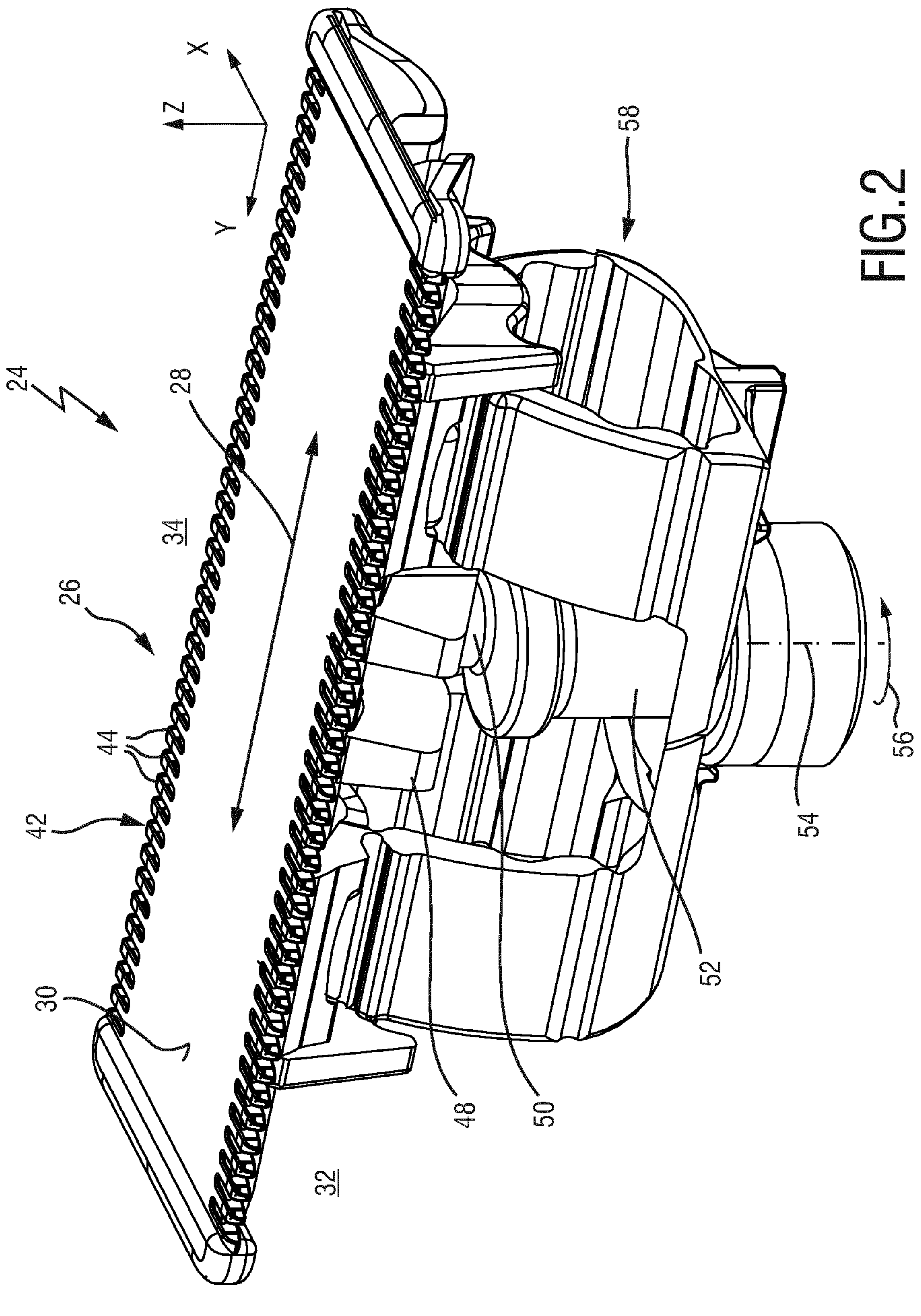
FIG. 2 shows a perspective top view of an exemplary embodiment of a blade set for a hair cutting appliance.

In FIG. 2, a perspective view of a blade set 26 for a processing head or cutting head 24 of a hair cutting appliance 10 is shown. As with the embodiment shown in FIG. 1, a cutting direction and/or a direction of a relative movement of blades of the blade set 26 is indicated by an arrow 28. A top side of the blade set 26 that is facing the user when the appliance 10 is operated is indicated by 30. In the exemplary embodiment shown in FIG. 2, the blade set 26 is provided with a first leading edge 32 and a second leading edge 34. In FIG. 2 a stationary blade 42 of the blade set 26 is shown. A movable blade (cutter blade) is covered by the stationary blade 42 in FIG. 2. Stationary blade teeth are indicated by 44.

The movable blade of the blade set 26 that is not visible in FIG. 2 is operated and actuated via a driving engagement element 48 that may also be referred to as driving bridge. At the element 48, a driving or engagement slot is formed that is engaged by a driving pin 50 of a driving shaft 52. The driving shaft 52 is rotated about a driving axis 54, refer to a curved arrow 56. The driving pin 50 is off-centered with respect to the driving axis 54. Consequently, as the driving pin 50 is revolving, a reciprocating movement of the movable blade with respect to the stationary blade 42 is effected.

In FIG. 2, there is further indicated a pivot mechanism 58 which may be referred to as a contour following feature. The mechanism 58 enables a certain pivot movement of the blade set 26 about the Y-axis.

With reference to FIGS. 3 to 15, exemplary embodiments of blade sets that are operable in an appliance 10 as shown in FIG. 1 and a processing head 24 as shown in FIG. 2 will be illustrated and described in more detail.

Figure 3:
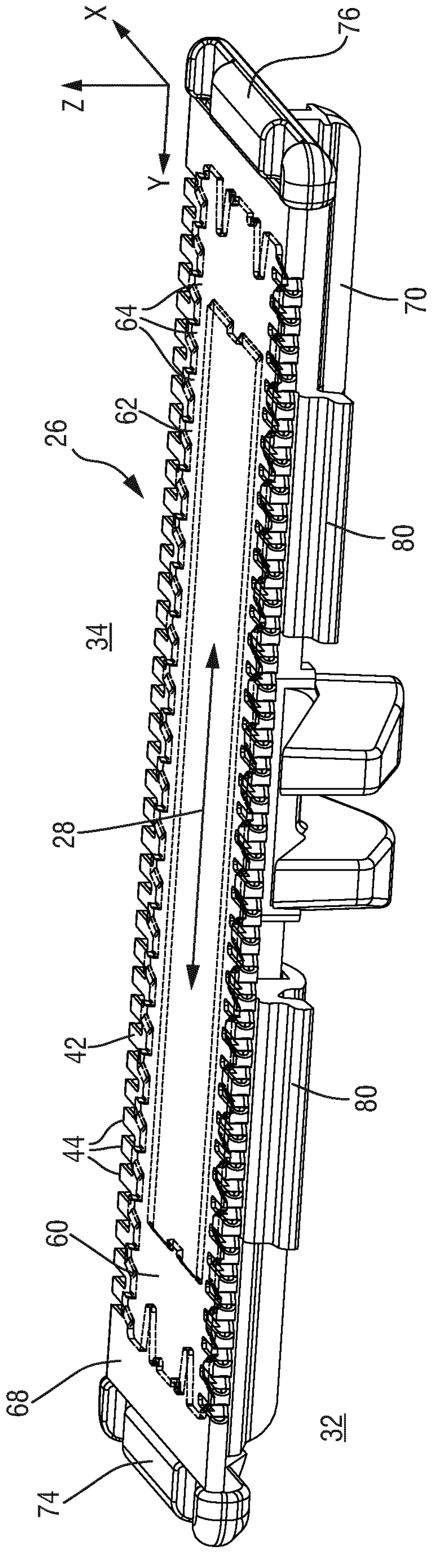
FIG. 3 shows a perspective top view of an exemplary embodiment of a blade set in accordance with the present disclosure.
Figure 4:
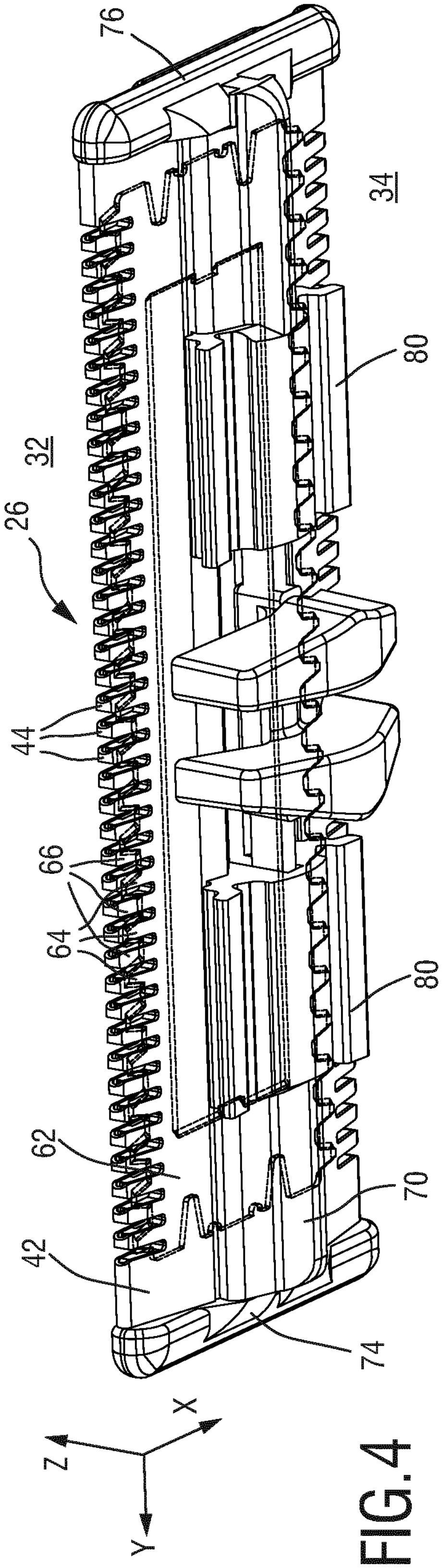
FIG. 4 shows a perspective bottom view of the arrangement of FIG. 3.

FIG. 3 and FIG. 4 show perspective views of an exemplary embodiment of a blade set 26 in accordance with the present disclosure. For illustrative purposes, a movable blade 62 of the blade set 26 that is fully covered in the views of FIG. 3 and FIG. 4 by the stationary blade 42 is shown in a dashed line presentation. The movable blade 62 is explicitly shown in the exploded views of FIG. 6 and FIG. 7.

The movable blade 62 is accommodated in a guide slot 60 defined by the stationary blade 42. In the guide slot 60, the movable blade 62 is reciprocatingly movable, refer to the double-arrow 28 in FIG. 3. Hence, teeth 64 of the movable blade 62 may cooperate with teeth 44 of the stationary blade 42 to cut hair. Between the movable blade teeth 64, tooth slots 66 are formed, refer also to FIG. 8 and FIG. 9.

In accordance with major aspects of the present disclosure, the stationary blade 42 is an assembly that includes a metal component 68 and a support insert 70. In this context, reference is made to the exploded top view of FIG. 5. As shown therein, the stationary blade 42 is composed of at least two separate components that are mounted to one another. As shown in any of FIGS. 3 to 5, a first lateral end of the stationary blade 42 is formed by an end piece 74.

Figure 5:
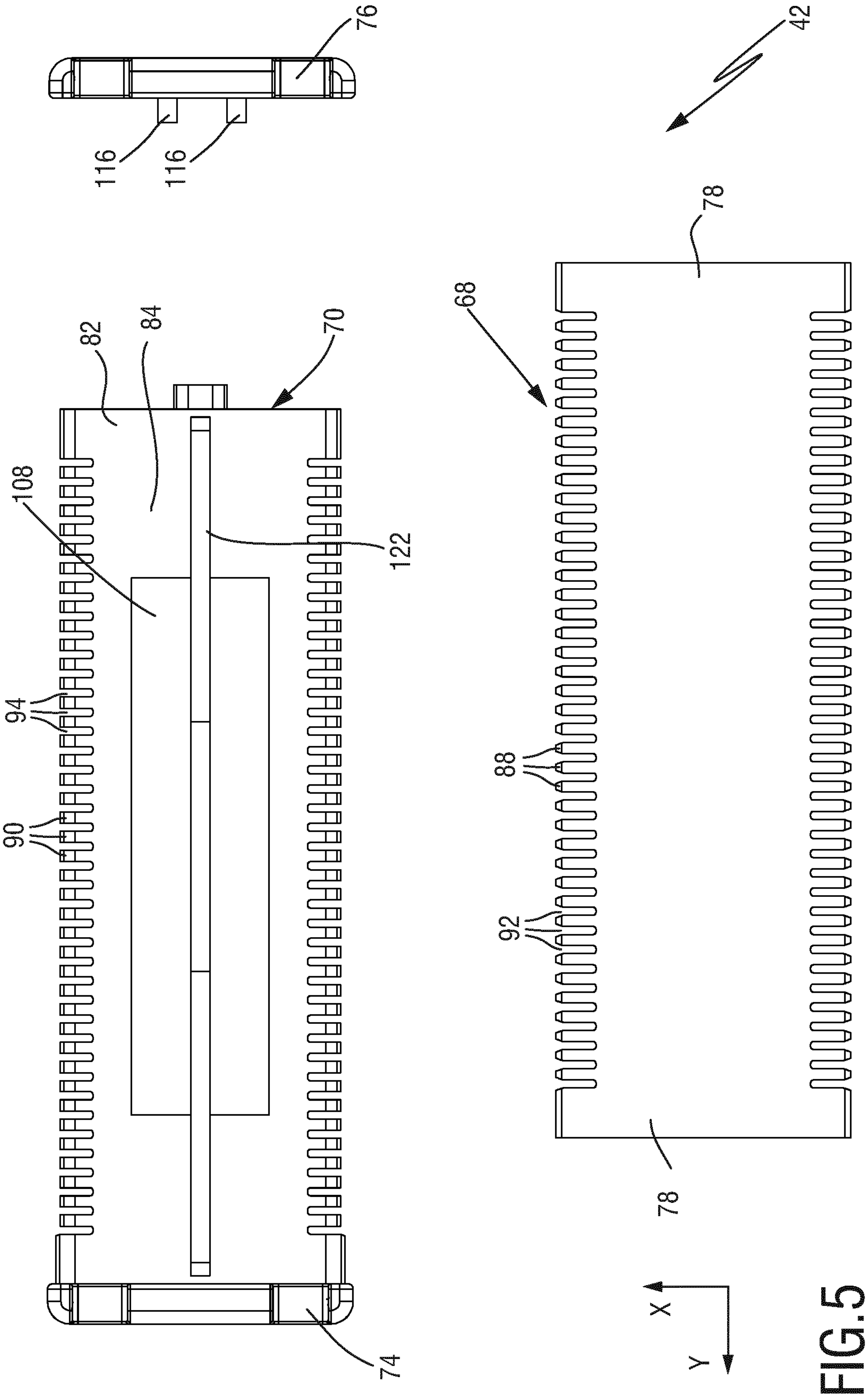
FIG. 5 shows a top view of components of the blade set shown in FIG. 3 and FIG. 4 in an exploded state.

A second, opposite lateral end of the stationary blade 42 is formed in the exemplary embodiment by an end cap 76. As shown in FIG. 5, the end cap 76 of the exemplary embodiment is a separate part that is arranged to be attached to the support insert 70. By contrast, the end piece 74 is integrally formed with the support insert. In the assembled state as shown in FIG. 3 and FIG. 4, the metal component 68 and also the movable blade 62 are retained at the support insert 70 between the end piece 74 and the end cap 76. Hence, the end piece 74 and the end cap 76 form lateral ends of the blade set 26. In the mounted state, lateral ends 78 of the metal component 68 contact the end piece 74 and the end cap 76, respectively.

In at least some embodiments, the support insert 70 is a molded part. By way of example, the support insert 70 is an injection-molded plastic part. Hence, further features and elements may be integrally formed with the support insert 70. By way of example, at a bottom side of the support insert 70 that is visible in FIG. 4 and FIG. 7, mounting features 80 are formed thereon. The mounting features 80 may be arranged as mounting hooks that are arranged to engage corresponding locking features of the processing head 24, for instance locking features that are present at the contour following feature 58 indicated in FIG. 2.

Figure 6:
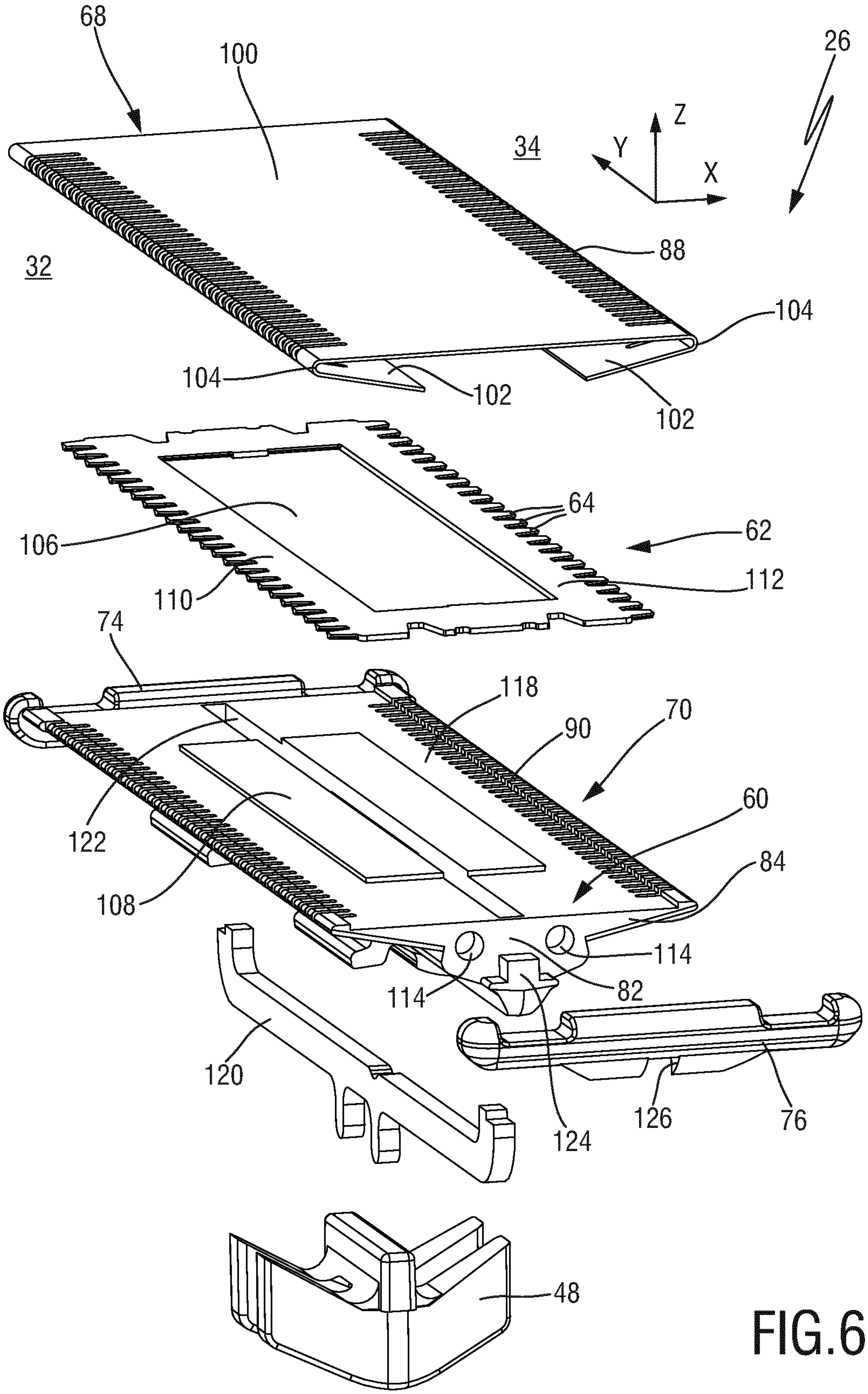
FIG. 6 shows a perspective exploded top view of the arrangement of FIG. 3.

A lateral end of the support insert 70 that is engaged by the end cap 76 in the mounted state is indicated by 82 in FIG. 5 and FIG. 6. The lateral end 82 contacts the end cap 76 in the mounted state. Further, the support insert 70 comprises a support wall 84 extending between the lateral end 82 and the end piece 74.

In the exemplary embodiments discussed in connection with FIGS. 3 to 12, the teeth 44 of the stationary blade 42 are jointly defined by tooth portions 88, 90 of the metal component 68 and the support insert 70. The tooth portions 88 are formed at the metal component 68. The tooth portions 90 are formed at the support insert 70. Between the tooth portions 88, tooth slots 92 are formed. Between the tooth portions 90, tooth slots 94 are formed, refer to FIG. 5.

The tooth portions 90 extend from the support wall 84 of the support insert 70 in a longitudinal direction. The tooth portions 88 of the metal component 68 are jointly defined by a first wall 100 and a second wall 102 thereof. In this context, reference is made to FIG. 6 and FIG. 7. As shown therein, the metal component 68 is obtained from sheet metal material through bending or folding. Hence, based on a single planar sheet metal blank, U-shaped or V-shaped tooth portions 88 may be obtained between which respective slots 92 are formed. By bending or folding the metal component 68, the first leading edge 32 and the second leading edge 34 of the stationary blade 42 are defined.

In the exemplary embodiments of FIGS. 3 to 12, the tooth portions 88 of the metal component 68 and the tooth portions 90 of the support insert 70 are aligned to one another, wherein the tooth portions 88 cover respective tooth portions 90.

At the leading edges 32, 34, a folding/bending edge 104 is provided at a transition between the first wall 100 and the second wall 102. In other words, the portion of the original planar sheet metal blank that forms the second wall 102 is bended by about 150° to 180° (degree) to define the U-shape or V-shape of the tooth portions 88 and the resulting teeth 44. At the folding/bending edge 104, a respective rounding may be provided.

Figure 7:
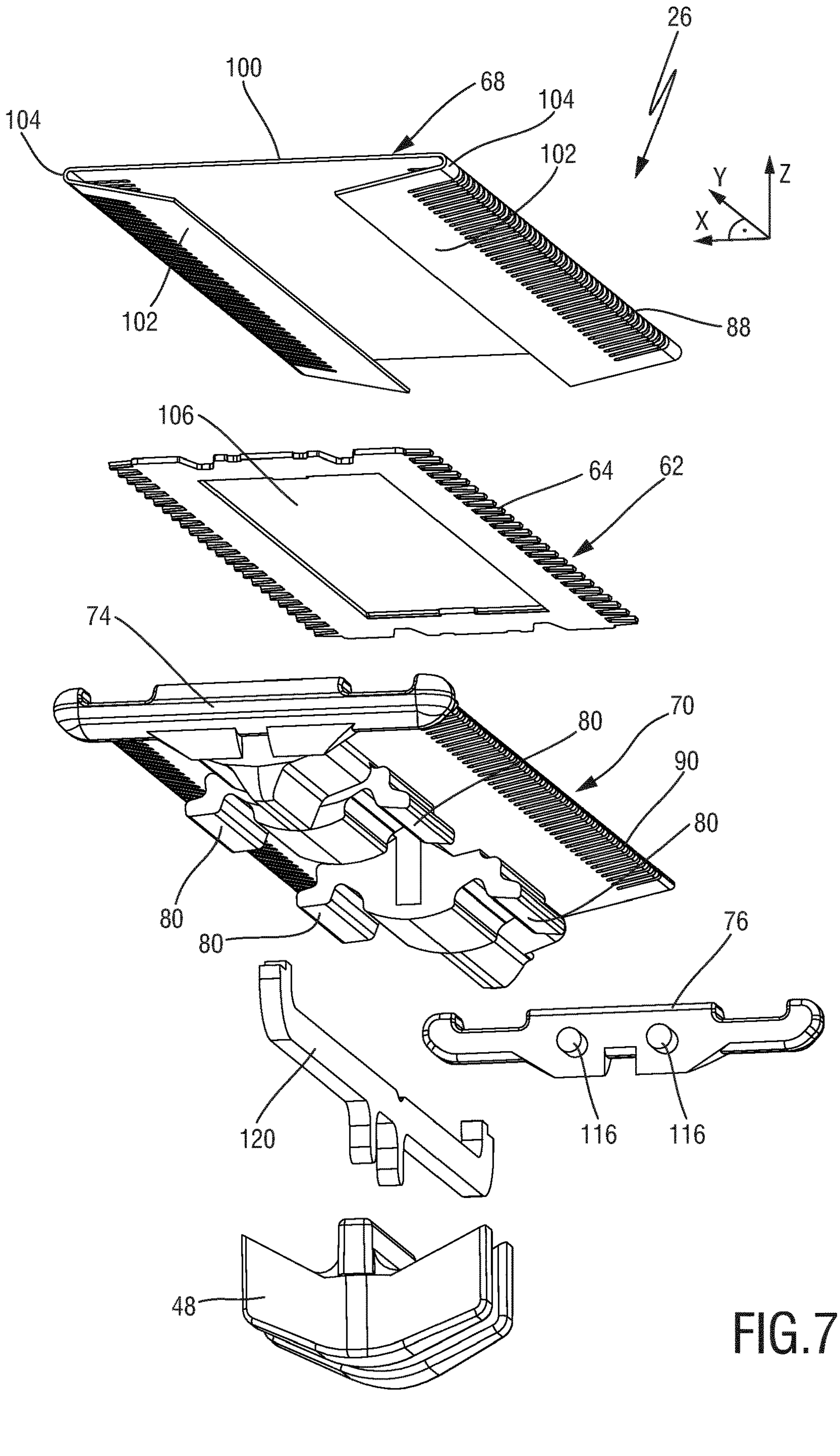
FIG. 7 shows a perspective exploded bottom view of the arrangement of FIG. 6.

Further, as shown in FIG. 6 and FIG. 7, at the movable blade 62, a guide recess 106 that forms a guide window is formed. The guide recess 106 cooperates with a guide protrusion 108 at the support insert 70. As a consequence, a positive fit guiding feature for the movable blade 62 in the guide slot 60 is formed. Hence, a longitudinal position of the movable blade 62 in the guide slot 60 is accurately defined. In operation, the movable blade 62 is moved in the lateral direction, involving a sliding movement between the guide recess 106 and the guide protrusion 108.

The guide recess 106 of the movable blade 62 is formed between a first support wall 110 and a second support wall 112. From the support walls 110, 112, the movable blade teeth 64 extend in the longitudinal direction. Further, the support walls 110, 112 are connected at the lateral ends of the movable blade 62, thereby defining the guide recess 106.

In an exemplary embodiment, the end cap 76 is arranged to be fitted in/onto the support insert 70. To this end, mounting recesses 114 are formed at the lateral end 82 of the support insert 70, refer to FIG. 6. At the end cap 76, mounting pins 116 are formed, refer to FIG. 5 and FIG. 7. The mounting pins 116 are arranged to engage the mounting recesses 114, thereby attaching the end cap 76 at the support insert 70.

Needless to say, there are further alternatives to attach the end cap 76 at the support insert 70. Further, in alternative embodiments, no separate end cap 76 is necessary. The mounting of the end cap 76 may involve a snap-on locking, a bonding procedure, and/or similar connection techniques.

In FIG. 6, a guide surface or guide contour for the movable blade 62 in the guide slot 60 at the stationary blade 42 is indicated by 118. The guide contour involves at least a bottom guide surface for the movable blade 62. Hence, in the attached state, the movable blade 62 is retained between the first wall 100 of the metal component 68 and the guide contour 118 formed at the support insert 70.

In FIG. 6 and FIG. 7, also the driving engagement element 48 is illustrated. Element 48 is arranged to be attached to a driving connector 120. The driving connector 120 may also be referred to as driving bridge. The driving connector 120 connects the driving engagement element 48 and the movable blade 62. Hence, via the driving connector 120, a driving movement may be transferred to the movable blade 62. At the support insert 70, a driving slot 122 for the driving connector 120 is formed. Hence, a defined laterally movable mounting for the driving connector 120 at the stationary blade 42 is provided.

In FIG. 6, there is further shown a guide stub 124 formed at the lateral end 82 of the support insert 70. In the mounted state, the guide stub 124 cooperates with a mating recess 126 at the end cap 76. Hence, the guide stub 124 defines the mounting position for the end cap 76.

Figure 8:
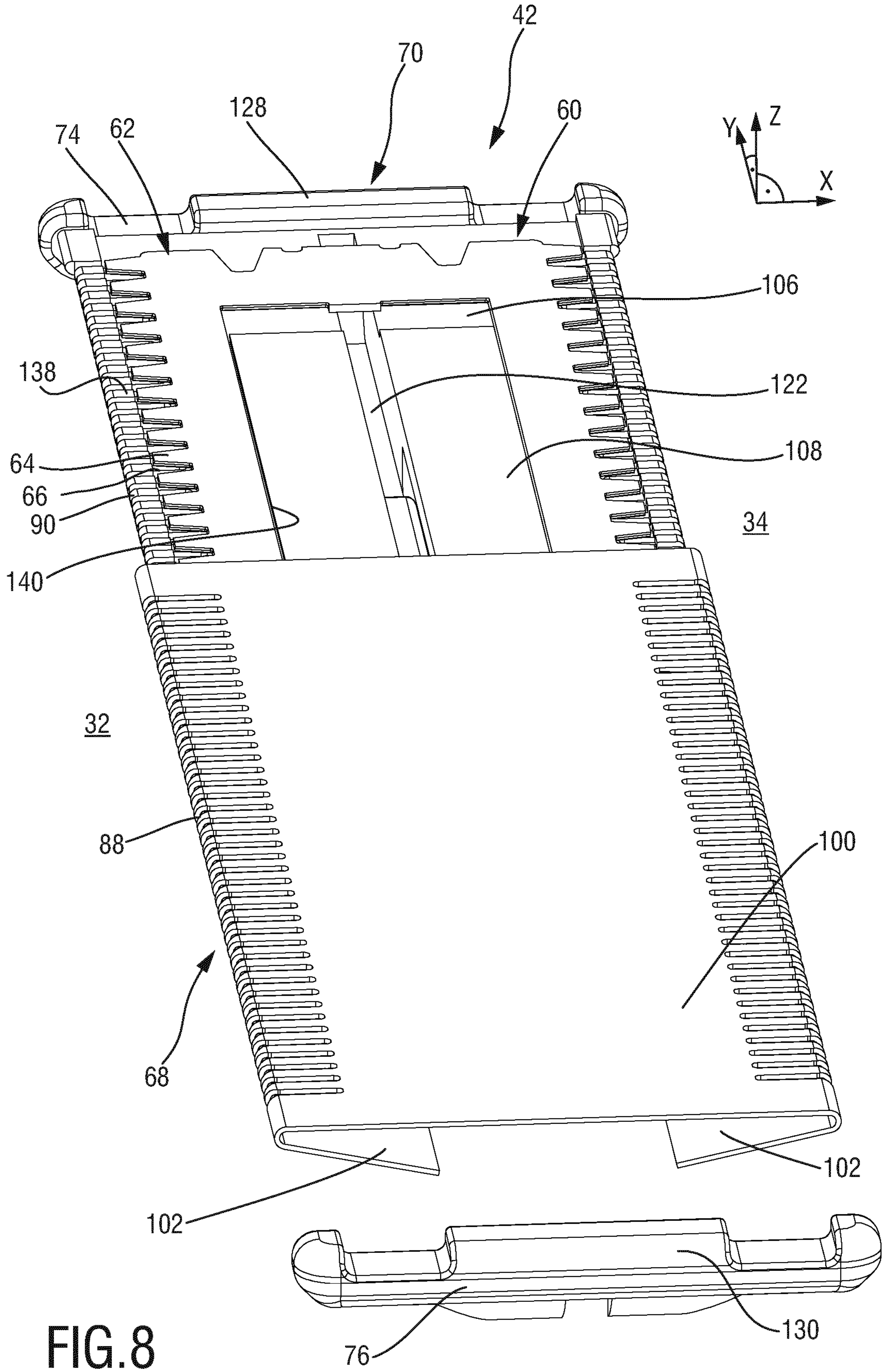
FIG. 8 shows a perspective top view of an embodiment of a blade set, wherein components thereof are shown in a detached state.

As shown in FIG. 8, lateral limit stops 128, 130 for the movement of the movable blade 62 in the guide slot 60 at the stationary blade 42 are provided. The limit stop 128 is formed at the end piece 74. The limit stop 130 is formed at the end cap 76.

Figure 9:
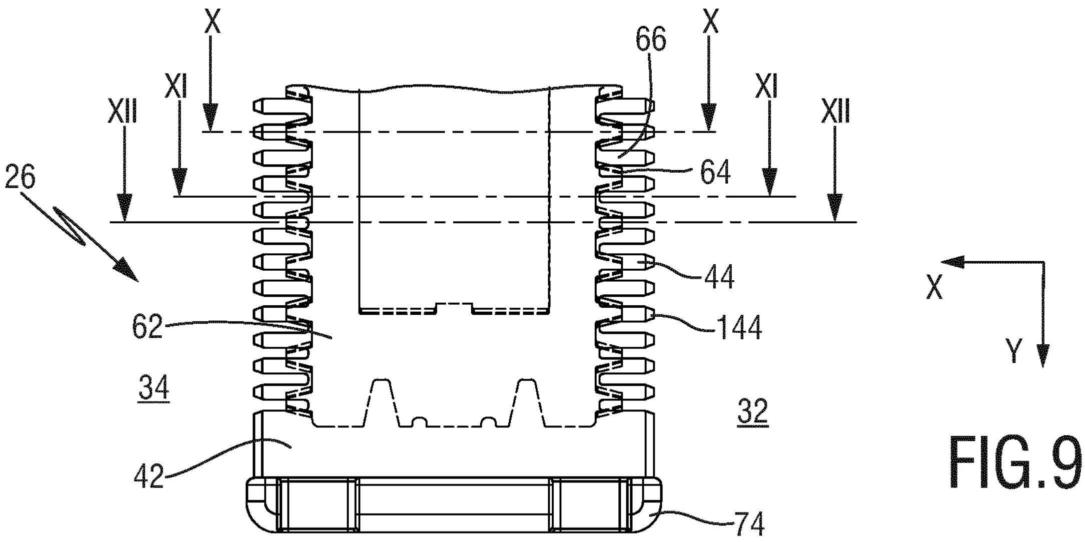
FIG. 9 shows a partial top view of an embodiment of a blade set in accordance with the present disclosure.
Figure 10:
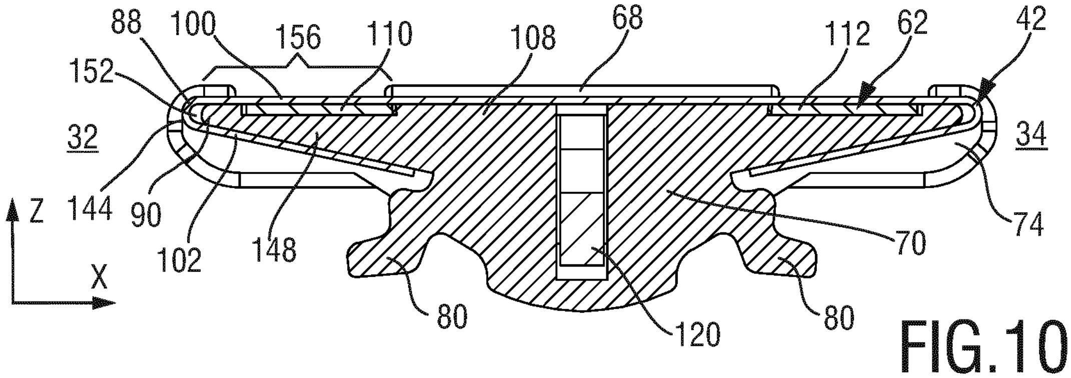
FIG. 10 shows a lateral cross-sectional view along the line X-X in FIG. 9.
Figure 11:
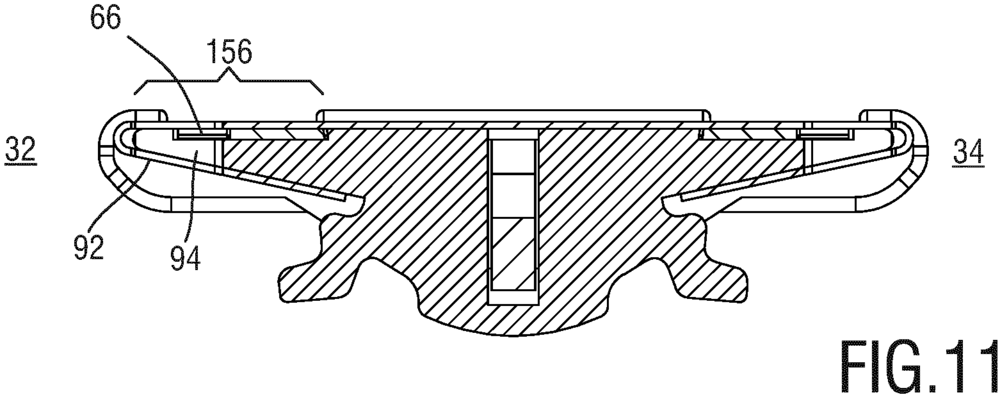
FIG. 11 shows a lateral cross-sectional view along the line XI-XI in FIG. 9.
Figure 12:
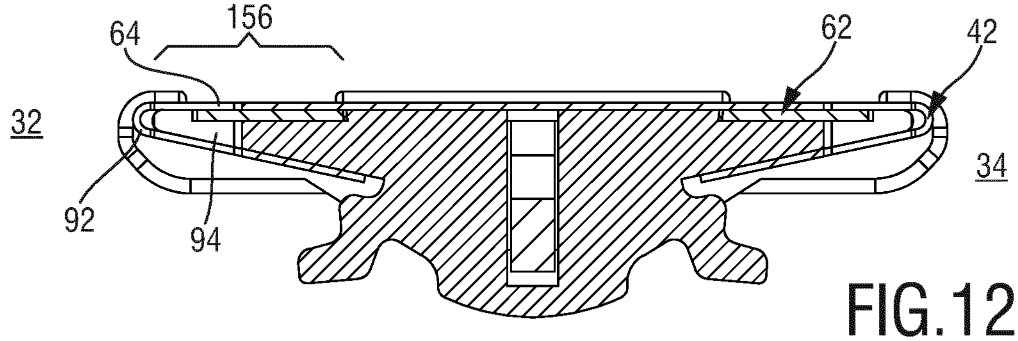
FIG. 12 shows a lateral cross-sectional view along the line XII-XII in FIG. 9.
Figure 13:
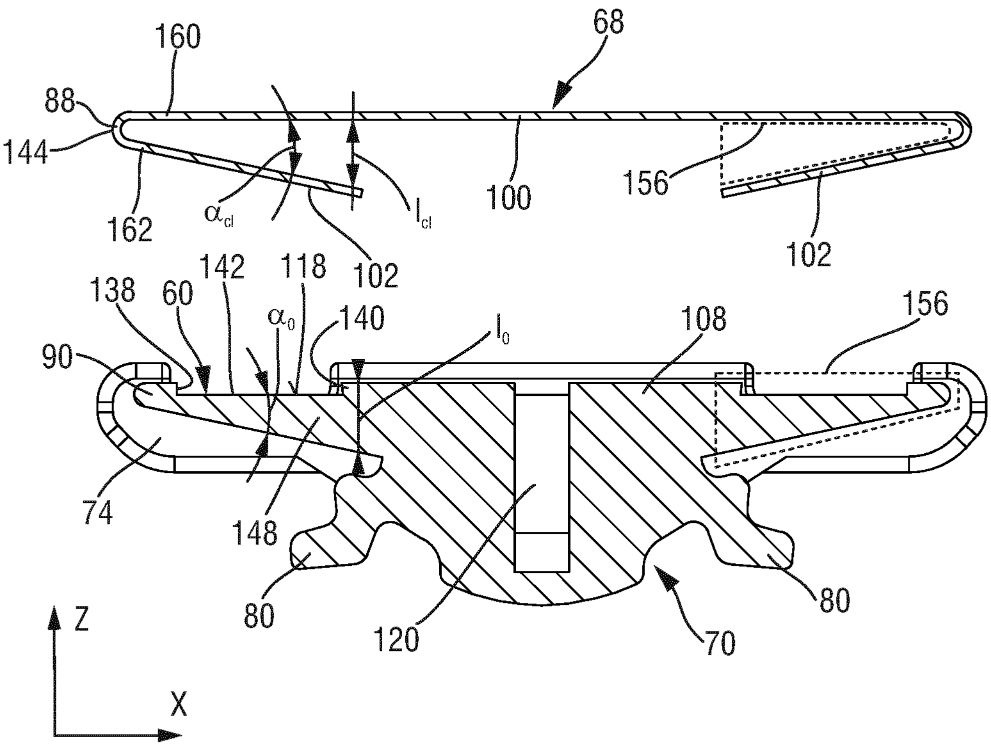
FIG. 13 shows a lateral cross-sectional view of the stationary blade of the arrangement shown in FIG. 10, wherein components of the stationary blade are shown in a detached state.

Further reference is made to the partial top view of FIG. 9, and to the corresponding cross-sectional lateral views of FIG. 10, FIG. 11 and FIG. 12. Additional reference is made to the enlarged lateral cross-sectional view of FIG. 13. FIG. 10 is a cross-sectional view along the line X-X in FIG. 9. FIG. 11 is a cross-sectional view along the line XI-XI in FIG. 9. FIG. 12 is a cross-sectional view along the line XII-XII in FIG. 9. FIG. 13 shows an exploded view of an exemplary embodiment of a stationary blade 42 in accordance with the arrangement of the cross-sectional view of FIG. 10.

In the cross-sectional view of FIG. 10, a cross-section of stationary blade teeth 44 and movable blade teeth 62 is shown. In FIG. 11, a cross-sectional view through a tooth slot 66 of the movable blade 62 and through tooth slots 92, 94 of the stationary blade 42 is shown. In FIG. 12, a cross-sectional view of the movable blade teeth 64 and the tooth slots 92, 94 of the stationary blade 42 is shown.

As can be best seen in FIG. 13, the support insert 70 defines a frontal longitudinal boundary 138, a rear longitudinal boundary 140, and a bottom boundary 142 for the guide slot 60. A top boundary of the guide slot 60 is defined by the first wall 100. The bottom boundary 142 is formed by the support wall 84. As the support insert 70 is in at least some embodiments molded, it is easy to define the guide slot 60 in such a way that the movable blade 62 is accurately accommodated therein. It is important to receive the movable blade 62 in such a way in the guide slot 60 that a defined contact between the movable blade teeth 62 and the stationary blade teeth 44 is provided. Hence, a defined vertical clearance is necessary to provide a certain ease of motion for the movable blade 62. On the other hand, the vertical clearance in the guide slot 60 may not be too large since otherwise no tight contact between the movable blade teeth 64 and the stationary blade teeth is ensured. Basically the same applies to the longitudinal position of the movable blade 62 in the guide slot 60 that is defined by the frontal longitudinal boundary 138 and/or the rear longitudinal boundary 140.

In FIG. 9 and FIG. 10, tips of the stationary blade teeth 44 are indicated by 144. The tips 144 are primarily defined by the first wall 100 and the second wall 102 that merge into one another at the tips 144.

Between the first wall 100 and the second wall 102, adjacent to the guide slot 60, a connector arm 148 is formed at the support insert 70. The connector arm 148 extends between the first wall 100 and the second wall 102. The connector arm 148 forms the frontal longitudinal boundary 138, the rear longitudinal boundary 140, and the bottom boundary 142. Further, the connector arm 148 defines an offset that ensures a tight and close contact between the support insert 70 and the first wall 100 and the second wall 102 of the metal component 68 in the mounted state.

In some embodiments, as indicated in FIG. 10, a tip offset 152 between the tooth portion 88 of the metal component 68 and the tooth portion 90 of the support insert 70 is present. The tip offset 152 enables a certain flexibility of the second wall 102 with respect to the first wall 100 that contributes to the pretensioned well-defined mounting of the metal component 68 and the support insert 70.

Further, the tip offset 152 facilitates mounting the metal component 68 and the support insert 70. The mounting procedure typically involves a relative lateral sliding movement between the metal component 68 and the support insert 70. When the tooth portions 90 of the support insert 70 would completely fill the gap defined by the metal component tooth portions 88 in the longitudinal direction, there might be a certain likelihood of damaging or even breaking the tooth portions 90. So it is beneficial to form the tooth portions 90 of the support insert 70 in the longitudinal direction in such a way that the interior space provided by the convexly shaped tooth portions 88 of the metal component 68 is not completely filled.

In FIGS. 10 to 13, a contact region 156 between the metal component 68 and the support insert 70 is indicated by 156. As used herein, the contact region 156 is a region wherein a contact between the metal component 68 and the support insert 70 is possible, and wherein at least a part of the guide slot 80 is formed. In the contact region 156, a tight, at least slightly preloaded contact between the metal component 68 and the support insert 70 is provided. The support insert 70, particularly the connector arm 148 thereof, is arranged between the first wall 100 and the second wall 102.

As discussed above, the metal component 68 is arranged such that in an unassembled state a distance or gap between the first wall 100 and the second wall 102 in the contact region 156 is smaller than a corresponding mating contour of the connector arm 148 of the support insert 70. Hence, in the mounted state, a certain preloading and the metal component 68 is induced, as the first wall 100 and the second wall 102 are at least slightly urged away from one another in the contact region 156.

As indicated herein before, the tooth portions 88 of the metal component 68 that form a considerable portion of the stationary blade teeth 44 are U-shaped or V-shaped. That is, the tooth portions 88 comprise a first leg 160 and a second leg 162 that contact one another to form the tips 144. The first leg 160 is formed by the first wall 100. The second leg 162 is formed by the second wall 102.

In FIG. 13, respective mating dimensions of the support insert 70 and the metal component 68 are indicated. At the metal component 68, at least one of a vertical clearance $l_{cl}$ and/or a clearance angle $\alpha_{cl}$ (alpha$_{cl}$) is present between the first wall 100 (or the first leg 160) and the second wall 102 (or the second leg 162).

At the support insert 70, particularly at the connector arm 148, at least one of a vertical offset $l_o$ or a vertical mounting angle $\alpha_o$ (alpha$_o$) is present at opposite surfaces that are arranged to contact the first wall 100 and the second wall 102 in the mounted state, respectively.

In the detached state as shown in FIG. 13, the first leg 160 and the second leg 162 are closer to one another than in the assembled state (as indicated in FIGS. 10 to 12) as in the assembled state. The relative position between the first wall 100 and the second wall 102 is defined by the connector arm 148. In other words, the vertical clearance $l_{cl}$ is smaller than the vertical offset $l_o$ and/or the clearance angle $\alpha_{cl}$ is smaller than the offset angle $\alpha_o$, at least slightly.

As a consequence, a force-fitted or interference-fitted mounting of the metal component 68 and the support insert 70 is enabled. Preferably, a close contact between any of the first leg 160 and the second leg 162 and the corresponding surfaces of the connector arm 148 is possible. Hence, any resulting gaps after the mounting procedure are preferably avoided.

In connection with the above-described FIGS. 1 to 13, several aspects and embodiments of the present disclosure have been discussed with reference to relatively detailed embodiments. Based thereon, reference is made to FIG. 13, FIG. 14 and to FIG. 15 each schematically illustrating alternative embodiments that may however utilize at least some of the above-discussed features, components and subassemblies. Therefore, in the following primarily deviations are emphasized and explicitly discussed. Apart from that, the arrangements of any of FIGS. 14, 15 and 16 may be arranged in accordance with the above-discussed embodiments.

Figure 14:
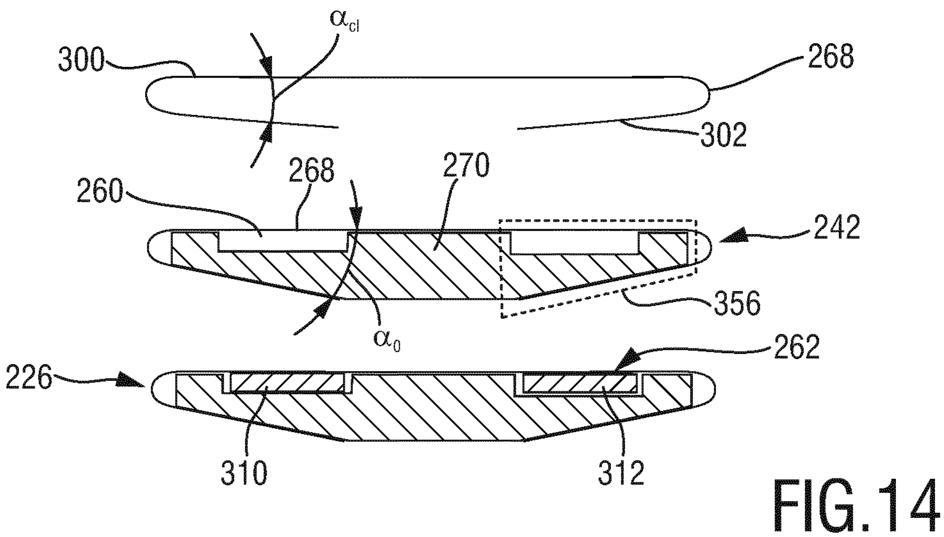
FIG. 14 shows in a schematic simplified cross-sectional view a further embodiment of a blade set in accordance with the present disclosure.

FIG. 14 schematically illustrates a lateral cross-sectional view of a blade set 226. In FIG. 14, a view of a metal component 268 in isolation is provided. Further, a corresponding view of a stationary blade 242 that implements the metal component 268 and a corresponding support insert 270 is shown. In addition, an assembled state of the blade set 226 is shown, wherein a movable blade 262 is mounted to the stationary blade 242.

As already discussed herein before, the metal component 268 comprises a first wall 300 and a second wall 302. In the mounted state of the stationary blade 242, the support insert 270 is arranged between the first wall 300 and the second wall 302 to form the blade set 226, and to define a guide slot 260 therein. In the mounted state, the movable blade 262 is accommodated in the guide slot 260, refer to reference numerals 310, 312 indicating respective support walls of the movable blade 262. Further, a contact region between the metal component 268 and the support insert 270 is indicated by a dashed box 356.

Figure 15:
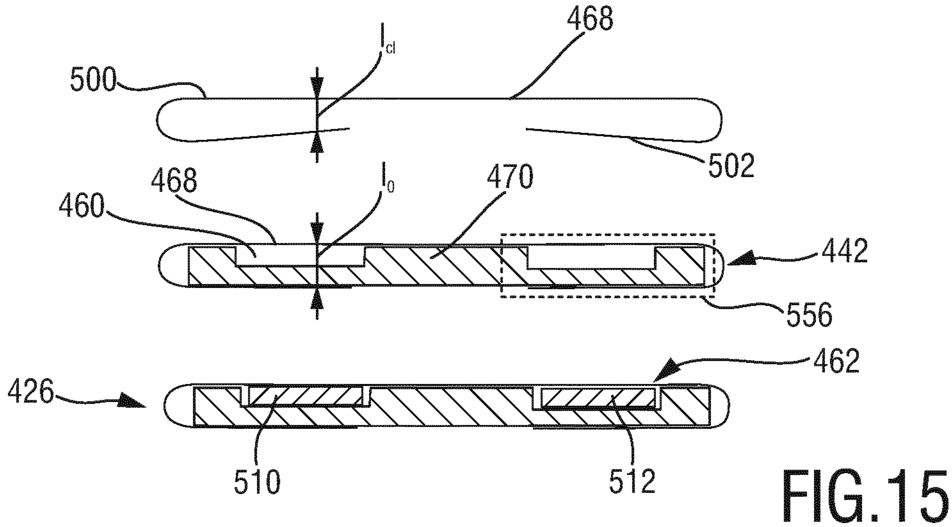
FIG. 15 shows in a schematic simplified cross-sectional view a further embodiment of a blade set in accordance with the present disclosure.

FIG. 15 schematically illustrates a lateral cross-sectional view of a further exemplary arrangement of a blade set 426. In FIG. 15, a view of a metal component 468 in isolation is provided. Further, a corresponding view of a stationary blade 442 that implements the metal component 468 and a corresponding support insert 470 is shown. In addition, an assembled state of the blade set 426 is shown, wherein a movable blade 462 is mounted to the stationary blade 442.

The metal component 268 comprises a first wall 500 and a second wall 502. In the mounted state of the stationary blade 442, the support insert 570 is arranged between the first wall 500 and the second wall 502 to form the blade set 426, and to define a guide slot 460 therein. In the mounted state, the movable blade 462 is accommodated in the guide slot 460, refer to reference numerals 510, 512 indicating respective support walls of the movable blade 562. Further, a contact region between the metal component 568 and the support insert 570 is indicated by a dashed box 556.

Figure 16:
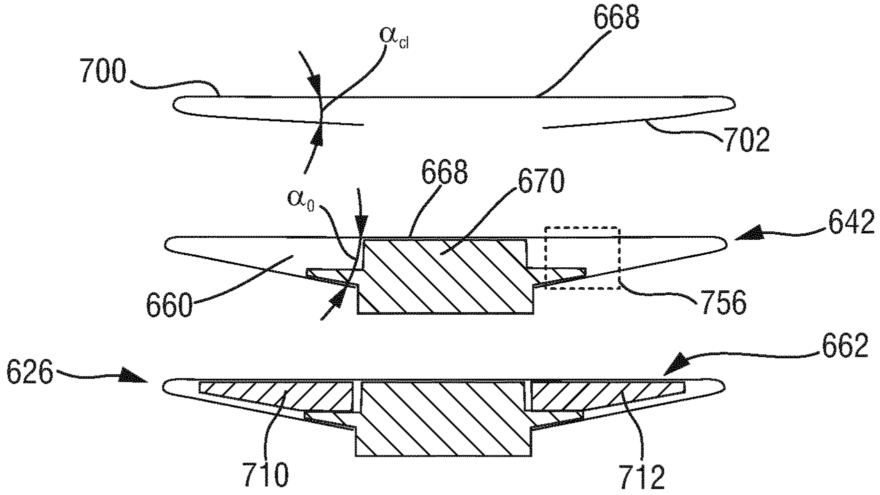
FIG. 16 shows in a schematic simplified cross-sectional view a further embodiment of a blade set in accordance with the present disclosure.

FIG. 16 schematically illustrates a lateral cross-sectional view of a further exemplary arrangement of a blade set 626. In FIG. 16, a view of a metal component 668 in isolation is provided. Further, a corresponding view of a stationary blade 642 that implements the metal component 668 and a corresponding support insert 670 is shown. In addition, an assembled state of the blade set 626 is shown, wherein a movable blade 662 is mounted to the stationary blade 642.

The metal component 668 comprises a first wall 700 and a second wall 702. In the mounted state of the stationary blade 642, the support insert 670 is arranged between the first wall 700 and the second wall 702 to form the blade set 626, and to define a guide slot 660 therein. In the mounted state, the movable blade 662 is accommodated in the guide slot 760, refer to reference numerals 710, 712 indicating respective support walls of the movable blade 762. Further, a contact region between the metal component 668 and the support insert 670 is indicated by a dashed box 756.

In any of FIG. 14, FIG. 15 and FIG. 16, the first wall 300, 500, 700 and the second wall 302, 502, 702 of the metal component 268, 468, 668 are closer to one another in a separated, isolated state than in the mounted state of the stationary blade 242, 442, 642.

Hence, in FIG. 14, a clearance angle between the first wall 300 and the second wall 302 is smaller than an offset angle $\alpha_o$ of the support insert 270 in the contact region 356. In FIG. 15, a vertical clearance $l_{cl}$ between the first wall 500 and the second wall 502 of the metal component 468 is smaller than a mounting offset $l_o$ provided by the support insert 470 in the contact region 556.

Similarly, in FIG. 16, a clearance angle $\alpha_{cl}$ between the first wall 700 and the second wall 702 of the metal component section 668 is smaller than an offset angle $\alpha_o$ provided by the support insert 670 in the contact region 756. Further, in FIG. 16, a longitudinal extension of the support insert 670 towards the respective tips of the teeth is smaller than in any of the support inserts 370, 570 of FIG. 14 and FIG. 15. However, also in the embodiment schematically illustrated in FIG. 16, an interference-fitted or force-fitted mounting of the metal component 668 and the support insert 670 to define the guide slot 670 therebetween is possible.

Figure 17:
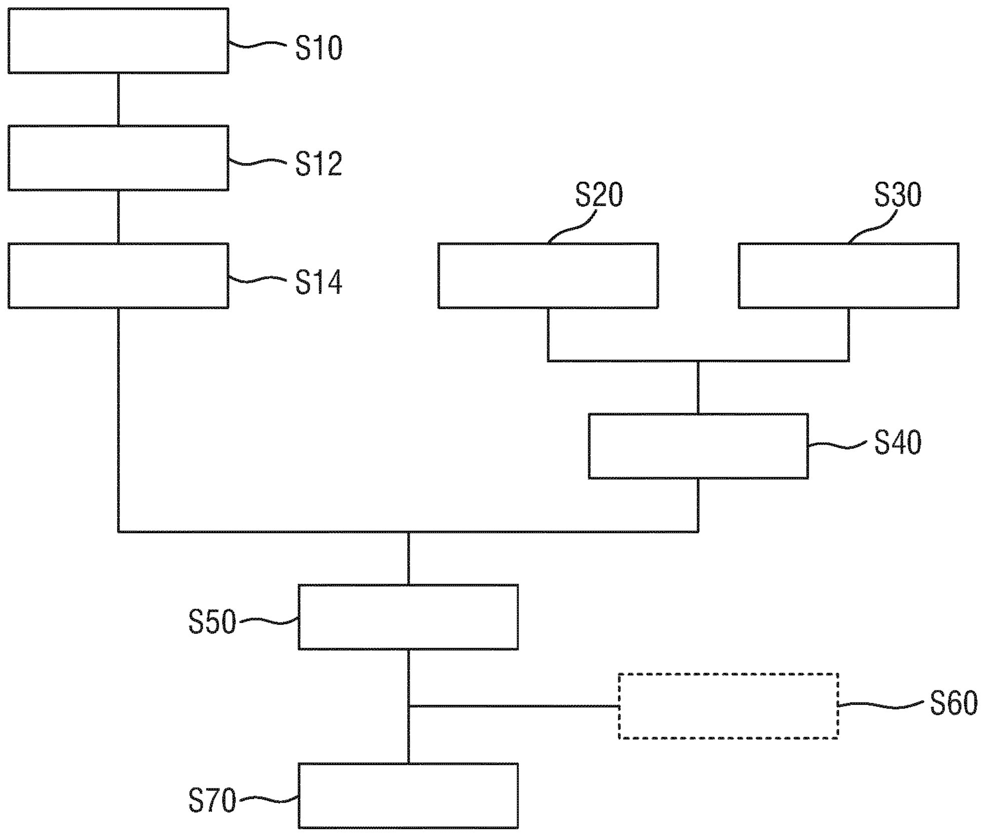
FIG. 17 shows a block diagram illustrating an exemplary embodiment of a method of manufacturing a blade set for a hair cutting appliance in accordance with the present disclosure.

Further reference is made to FIG. 17, schematically illustrating an exemplary embodiment of a method of manufacturing a blade set for a hair cutting appliance. The method involves the provision of a metal component, and a support insert that jointly form a stationary blade in which a movable blade is accommodated.

In a first step S10, a sheet metal blank is provided based on which the metal component is formed. In a following step S12, a series of tooth slots is processed in the sheet metal blank, preferably in an unfolded state. Hence, relatively simple manufacturing methods may be used. In a further step S14, the originally planar sheet metal blank is transformed. This may involve bending or folding the sheet metal material around a folding edge that is parallel to and crosses the series of tooth slots. Hence, a first wall and a second wall are formed that are connected to define a series of stationary blade teeth.

In a further step S20, a support insert is provided that is arranged to be inserted in the metal component processed in steps S10 to S14. The support insert may be obtained through molding, particular through injection-molding. Hence, the support insert may be made from plastic material, for instance. At the support insert, further features may be integrally formed, for instance a guide protrusion, mounting features, lateral end pieces, etc.

Further, in a step S30, a movable blade for the blade set is provided. Generally, the movable blade is adapted to be accommodated in a guide slot that is jointly defined by the metal component and the support insert.

To assemble the blade set, in a first assembly step S40, the movable blade is arranged in a mounting position at the support insert. In the joined state obtained through step S40, the sub-assembly of the support insert and the movable blade may be inserted in the metal component in a further assembly step S50. The first wall and the second wall of the metal component embrace or cover the support insert and also the movable blade, at least partially. Both the metal component and the support insert form the stationary blade.

Preferably, the metal component and the support insert are force-fitted or interference-fitted. Hence, a certain preloading or pretensioning is induced in the metal component that generates a retaining force. In the resulting assembled blade set, the movable blade is movably accommodated in a guide slot formed between the metal component and the support insert.

As indicated by dashed blocks, further optional steps S60 and S70 may follow. The optional step S60 involves the provision of an end cap for the stationary blade. The end cap may be an injection-molded plastic part.

In the step S70, the end cap is mounted to the support insert, to secure the assembly of the metal component and the support insert, and to retain the movable blade between respective lateral ends of the stationary blade.

In alternative embodiments, the mounted state of the metal component and the support insert and the defined movable arrangement of the movable blade in the guide slot is otherwise secured.

While the disclosure has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word “comprising” does not exclude other elements or steps, and the indefinite article “a” or “an” does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A stationary blade for a blade set of a hair cutting appliance, the blade set being arranged to be moved through hair in a moving direction to cut hair, the stationary blade comprising:

a plastic support insert and a metal component mounted to the plastic support insert, the metal component being at least sectionally deformed to define a toothed leading edge having double-walled stationary blade teeth, a first wall of the metal component arranged to serve as a skin-facing wall, a second wall facing away from the first wall, wherein the first and second walls are joined at the toothed leading edge of the metal component, the plastic support insert having a flat planar profile in a longitudinal and transverse direction, the flat planar profile contacting the metal component in both the longitudinal and transverse directions in a mounted position, wherein in an assembled state the metal component is at least partially pretensioned by a retaining force defined by a mounting clearance between the first wall and the second wall of the metal component that is smaller than a mounting extension of the plastic support insert in a contact region, wherein the metal component and the plastic support insert jointly form a substantially rectangular guide slot for a movable blade insertable into the guide slot in an assembled state, the guide slot being formed by a frontal longitudinal boundary, a rear longitudinal boundary and a bottom boundary of a laterally extending connector arm of the plastic support insert and a top boundary of the guide slot formed by the first wall of the metal component, wherein the vertical height of the guide slot is defined by a shape of the plastic support insert.

2. The stationary blade as claimed in claim 1, wherein the stationary blade teeth are, when viewed in a cross-sectional plane perpendicular to a lateral direction, substantially U-shaped or V-shaped and comprise a first leg formed by the first wall and a second leg formed by the second wall, and wherein the first leg and the second leg merge into one another to form a tip of the stationary blade teeth.

3. The stationary blade as claimed in claim 1, wherein the first wall and the second wall are spaced away from one another by the support insert.

4. The stationary blade as claimed in claim 1, wherein the metal component and the support insert are force-fitted to one another in an assembled state of the stationary blade, and/or wherein the metal component and the support insert form an interference-fitted assembly.

5. The stationary blade as claimed in claim 1, wherein the first wall and the second wall of the metal component are, in an unassembled state, spaced away from one another in a contact region by a clearance that is a spacing offset that is present at the support insert in the contact region in the assembled state.

6. The stationary blade as claimed in claim 1, wherein the metal component is a sheet metal component, and wherein the support insert is a separately formed injection molded plastic part.

7. The stationary blade as claimed in claim 1, wherein the support insert defines a laterally extending guide contour for an insertable movable blade.

8. The stationary blade as claimed in claim 1, wherein the support insert forms a frontal longitudinal boundary and a rear longitudinal boundary for the guide slot, wherein the guide slot is bounded by the first wall at a top side thereof, and wherein the support insert preferably forms a bottom boundary of the guide slot.

9. The stationary blade as claimed in claim 1, comprising a first toothed leading edge and a second toothed leading edge opposite to the first toothed leading edge, wherein the first wall of the metal component extends from the first toothed leading edge to the second toothed leading edge.

10. The stationary blade as claimed in claim 1, wherein in the mounted state a longitudinal tip offset is provided between tips of the tooth portions of the support insert and tips of the tooth portions of the metal component that defines a clearance between the support insert and the metal component of at least some of a stationary blade teeth.

11. The stationary blade as claimed in claim 1, wherein the support insert defines a frontal longitudinal boundary, a rear longitudinal boundary and a bottom boundary for the guide slot.

12. The stationary blade as claimed in claim 11, the stationary blade further comprising a connector arm formed at the support insert, the connector arm extending between the first wall and the second wall forming the frontal longitudinal boundary, the rear longitudinal boundary and the bottom longitudinal boundary.

13. The stationary blade as claimed in claim 1, wherein the support insert provides a vertical connection between the first wall and the second wall, particularly in a central region of the stationary blade.

14. The stationary blade as claimed in claim 7, wherein the guide contour includes at least a bottom guide surface for the movable blade.

15. The stationary blade as claimed in claim 1, wherein the end cap is arranged and configured to be fitted onto the support insert.

16. The stationary blade as claimed in claim 15, wherein mounting recesses are formed at a lateral end of the support insert to fit the end cap onto the support insert.

17. The stationary blade as claimed in claim 1, wherein lateral ends of the metal component respectively contact the end piece and the end cap.

18. The stationary blade as claimed in claim 1, wherein the stationary blade further comprises:

one or more mounting hooks integrally formed on a bottom surface of the plastic support insert, the mounting hooks being configured to engage corresponding locking features on a pivot mechanism of the hair cutting appliance, and one or more mounting pins formed at the end cap arranged to engage mounting recesses formed at a lateral end of the support insert, the mounting pins being configured to engage mounting recesses on the plastic support insert to attach the end cap at the support insert.

19. The stationary blade as claimed in claim 1, wherein the stationary blade further comprises an integrally formed end piece formed at a first lateral end and further comprises an end cap formed at a second lateral end, the metal component and an insertable movable blade being retained at the support insert between the end piece and the end cap.

* * * * *